United States Patent
Hubbard et al.

(10) Patent No.: US 10,181,905 B2
(45) Date of Patent: Jan. 15, 2019

(54) RAPID DEPLOYMENT INDEXING TERMINAL ARRANGEMENT

(71) Applicants: ADC Communications (Australia) Pty Limited, Berkeley Vale, New South Wales (AU); CommScope Connectivity Australia Pty Ltd., Mascot, NSW (AU)

(72) Inventors: Paul David Hubbard, New South Wales (AU); Wesley Edward Oxlee, New South Wales (AU)

(73) Assignees: ADC Communications (Australia) Pty Limited (AU); CommScope Connectivity Australia Pty Ltd. (AU)

( * ) Notice: Subject to any disclaimer, the term of this patent is extended or adjusted under 35 U.S.C. 154(b) by 0 days.

(21) Appl. No.: 16/042,356

(22) Filed: Jul. 23, 2018

(65) Prior Publication Data

US 2018/0331761 A1    Nov. 15, 2018

Related U.S. Application Data

(63) Continuation of application No. 15/046,936, filed on Feb. 18, 2016, now Pat. No. 10,033,463.

(Continued)

(51) Int. Cl.
*H04J 14/00*        (2006.01)
*H04B 10/2575*    (2013.01)
(Continued)

(52) U.S. Cl.
CPC ..... *H04B 10/25753* (2013.01); *G02B 6/4457* (2013.01); *G02B 6/4472* (2013.01);
(Continued)

(58) Field of Classification Search
CPC .............. H04B 10/25753; H04B 10/25; G02B 6/4457; G02B 6/4472; G02B 6/3897; G02B 6/445
(Continued)

(56) References Cited

U.S. PATENT DOCUMENTS 7,756,379 B2    7/2010    Kowalczyk et al.
7,894,701 B2    2/2011    Kowalczyk et al.
(Continued)

FOREIGN PATENT DOCUMENTS

FR       2 914 753 A1    10/2008
JP       10-32545         2/1998
(Continued)

OTHER PUBLICATIONS

International Search Report and Written Opinion for Application No. PCT/IB2016/000226 dated Jun. 21, 2016.
(Continued)

*Primary Examiner* — M. R. Sedighian
(74) *Attorney, Agent, or Firm* — Merchant & Gould P.C.

(57) ABSTRACT

A fiber optic distribution terminal includes a cable spool rotatably disposed within an enclosure; an optical power splitter and a termination region carried by the cable spool; an optical cable deployable from the enclosure by rotating the cable spool by pulling on a connectorized end of the optical cable; and splitter pigtails extending between the optical power splitter and the termination region. One fiber of the optical cable extending between the connectorized end and the splitter input. The other fibers of the optical cable extend to a multi-fiber adapter.

20 Claims, 5 Drawing Sheets

Related U.S. Application Data

(60) Provisional application No. 62/117,834, filed on Feb. 18, 2015.

(51) Int. Cl.
*H04B 10/25* (2013.01)
*G02B 6/44* (2006.01)
*G02B 6/38* (2006.01)

(52) U.S. Cl.
CPC ........... *H04B 10/25* (2013.01); *G02B 6/3897* (2013.01); *G02B 6/445* (2013.01)

(58) Field of Classification Search
USPC ......................................................... 398/66
See application file for complete search history.

(56) References Cited

U.S. PATENT DOCUMENTS

| | | | |
|---|---|---|---|
| 8,189,984 B2 | 5/2012 | Kowalczyk et al. | |
| 8,401,357 B2 * | 3/2013 | Solheid ................ | G02B 6/3849 385/135 |
| 8,494,333 B2 | 7/2013 | Kowalczyk et al. | |
| 8,705,929 B2 | 4/2014 | Kowalczyk et al. | |
| 8,891,931 B2 | 11/2014 | Kowalczyk et al. | |
| 9,036,974 B2 | 5/2015 | LeBlanc et al. | |
| 9,207,421 B2 | 12/2015 | Conner | |
| 9,223,106 B2 | 12/2015 | Coan et al. | |
| 9,261,663 B2 | 2/2016 | Loeffeihotz et al. | |
| 9,261,666 B2 | 2/2016 | Kowalczyk et al. | |
| 9,348,096 B2 | 5/2016 | Kmit et al. | |
| 9,684,142 B2 * | 6/2017 | Collart ................ | G02B 6/4452 |
| 9,703,063 B2 | 7/2017 | Van Baelen et al. | |
| 10,031,305 B2 * | 7/2018 | Leeman ................ | G02B 6/4452 |
| 10,031,307 B2 * | 7/2018 | Claessens ............ | G02B 6/3897 |
| 2008/0285933 A1 | 11/2008 | Vogel et al. | |
| 2014/0105558 A1 | 4/2014 | Kowalczyk et al. | |
| 2014/0259602 A1 | 9/2014 | Thompson | |
| 2015/0355428 A1 | 12/2015 | Leeman et al. | |
| 2016/0161693 A1 | 6/2016 | Loeffelholz et al. | |
| 2016/0187607 A1 | 6/2016 | Kowalczyk et al. | |
| 2016/0341914 A1 | 11/2016 | Kmit et al. | |
| 2017/0123175 A1 * | 5/2017 | Van Baelen ......... | G02B 6/3897 |

FOREIGN PATENT DOCUMENTS

| | | |
|---|---|---|
| JP | 2011-237797 | 11/2011 |
| WO | WO 2014/072368 A1 | 5/2014 |

OTHER PUBLICATIONS

Extended European Search Report for Application No. 16751981.8 dated Sep. 3, 2018.

\* cited by examiner

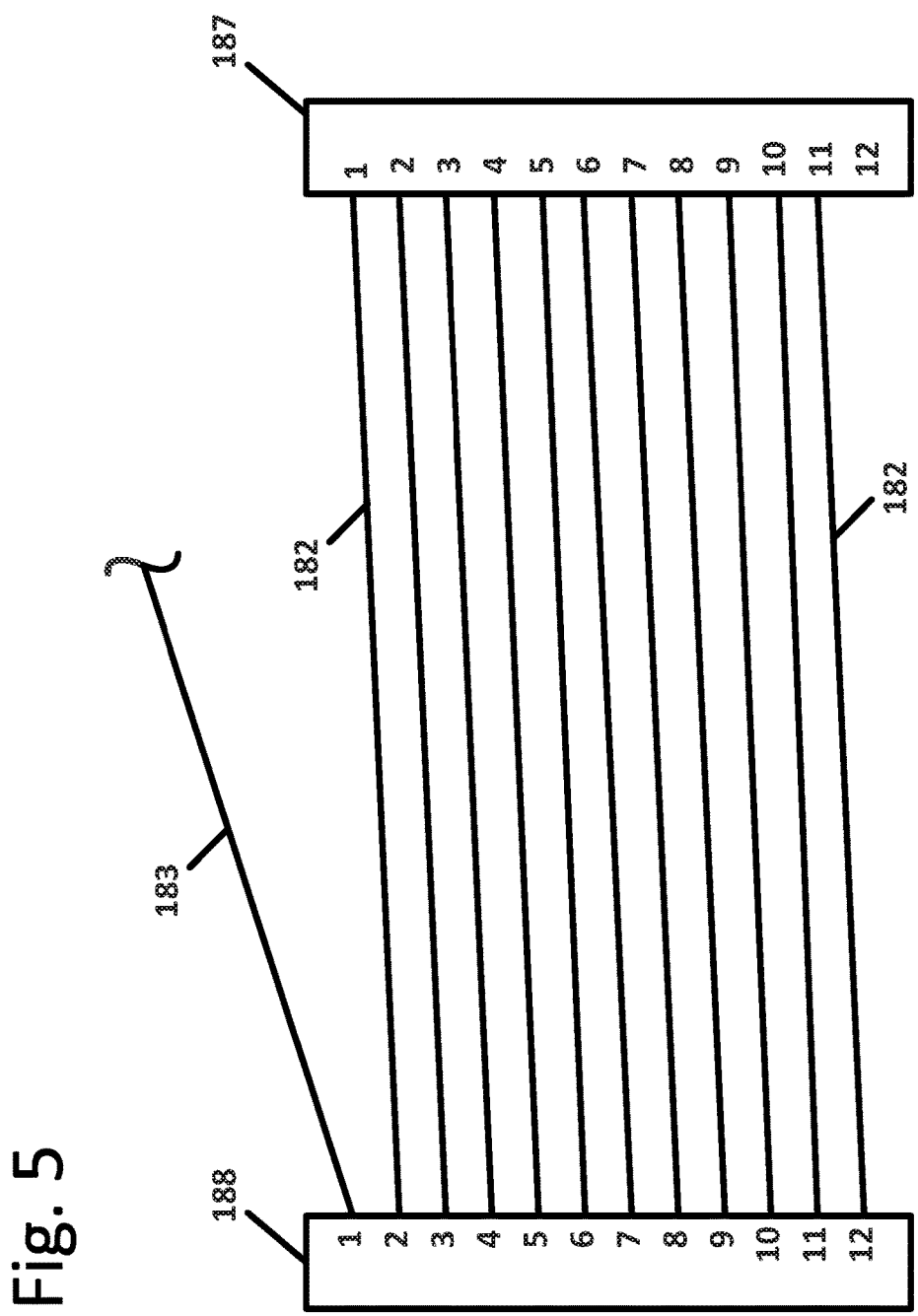

RAPID DEPLOYMENT INDEXING TERMINAL ARRANGEMENT

CROSS-REFERENCE TO RELATED APPLICATIONS

This application is a continuation of application Ser. No. 15/046,936, filed Feb. 18, 2016, issuing as U.S. patent Ser. No. 10/033,463, which application claims the benefit of provisional application Ser. No. 62/117,834, filed Feb. 18, 2015, which applications are incorporated herein by reference in their entirety.

BACKGROUND

As demand for telecommunications increases, fiber optic networks are being extended in more and more areas. In facilities such as multiple dwelling units, apartments, condominiums, businesses, etc., fiber optic enclosures are used to provide a subscriber access point to the fiber optic network. These fiber optic enclosures are connected to the fiber optic network through subscriber cables connected to a network hub. However, the length of subscriber cable needed between the fiber optic enclosure and the network hub varies depending upon the location of the fiber optic enclosure with respect to the network hub. As a result, there is a need for a fiber optic enclosure that can effectively manage varying lengths of subscriber cable.

SUMMARY

Some aspects of the disclosure are directed to a fiber optic distribution terminal including an enclosure; a cable spool disposed within the enclosure; an optical power splitter carried by the cable spool; and a termination region carried by the cable spool. The enclosure includes a base and a cover that is moveable relative to the base between an open position and a closed position. The enclosure defines a first cable port, a second cable port, and a plurality of subscriber ports. The cable spool is configured to rotate relative to the enclosure. The optical power splitter rotates in unison with the cable spool relative to the enclosure. The termination region rotates in unison with the cable spool relative to the enclosure. The termination region includes single-fiber optical adapters and a multi-fiber optical adapter. Each of the single-fiber optical adapters defines an adapter port that faces one of the subscriber ports of the enclosure. The multi-fiber optical adapter defines an adapter port that faces the second cable port.

In certain implementations, a first optical cable extending from a first end to a second end. The first optical cable is wrapped around the cable spool. The first optical cable extends through the first cable port so that the first end is disposed external of the enclosure. The second end of the first optical cable is routed to the termination region.

In certain implementations, a first optical fiber of the first optical cable is separated from a remainder of the optical fibers of the first optical cable at the second end of the first optical cable. The first optical fiber is directed to an input of the optical power splitter, which splits optical signals carried over the first optical fiber onto a plurality of splitter pigtails.

In certain implementations, connectorized ends of the splitter pigtails are received at the single-fiber optical adapters. In an example, a multi-fiber optical connector terminates the remainder of the optical fibers of the first optical cable. The multi-fiber optical connector is received at the multi-fiber adapter.

In certain implementations, the cable ports are sealed with a gasket when the base and cover are disposed in the closed position. In an example, the gasket includes a first portion mounted to the base and a second portion mounted to the cover.

In certain implementations, the enclosure is configured to be mounted to a wall.

In certain implementations, cable management structures carried by the cable spool so that the cable management structures rotate in unison with the cable spool relative to the enclosure.

Other aspects of the disclosure are directed to a fiber distribution system including a network access node receiving a network cable from a fiber optic network; a plurality of distribution terminals mounted at separate locations remote from the network access node; and a plurality of optical cables routed between the network access node and the distribution terminals so that optical signals carried by the network cable are carried to each of the distribution terminals along a first path in a first indexing direction and along a second path in a second indexing direction. At least some of the optical cables are paid out from the distribution terminals and excess length of the optical cables are stored in the distribution terminals.

In certain implementations, the network access node includes a fiber distribution hub. In some examples, the network access node is disposed in a basement of a multistory building, and the distribution terminals are deployed at the various stories in the building. In other examples, the network access node and the distribution terminals are disposed on a common floor in an office environment. Each of the distribution terminals is spaced from each other and from the network access node.

In certain implementations, at least one of the distribution terminals includes a cable spool disposed in an enclosure. The cable spool is rotatable relative to the enclosure to payout the respective optical cable. The cable spool also is configured to store any excess length of the respective optical cable.

In certain implementations, at least one of the distribution terminals includes an optical power splitter that splits optical signals onto a plurality of splitter pigtails that are plugged into a plurality of optical adapters within the distribution terminal. In certain examples, subscriber fibers enter the enclosure and plug into the optical adapters to optically couple to the splitter pigtails. In an example, the enclosure is environmentally sealed even when the subscriber fibers are extending through the enclosure.

Other aspects of the disclosure are directed to a fiber optic distribution terminal including an enclosure defining a first cable port, a second cable port, and a plurality of subscriber ports; a cable spool disposed within the enclosure and being configured to rotate relative to the enclosure; an optical power splitter carried by the cable spool so that the optical power splitter rotates in unison with the cable spool relative to the enclosure; a termination region carried by the cable spool; an optical cable wrapped around the cable spool, and splitter pigtails extending between the optical power splitter and the termination region. First ends of the optical fibers of the optical cable are terminated at a first optical connector. A second end of a first of the optical fibers of the optical cable is routed to a splitter input. Second ends of others of the optical fibers are terminated at a second optical connector. The others of the optical fibers are indexed between the first and second optical connectors. The termination region rotates in unison with the cable spool relative to the enclosure. The termination region includes single-fiber optical adapters and a multi-fiber optical adapter. Each of the single-fiber optical adapters defines an adapter port that faces one of the subscriber ports of the enclosure. The multi-fiber optical adapter defines an adapter port that faces the second cable port. The multi-fiber optical adapter receives the second optical connector.

In certain implementations, a second input fiber extending between the optical splitter and the second optical connector.

In certain implementations, the cable ports and subscriber ports are environmentally sealed.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 5 is a layout of an example fiber indexing scheme that can be used in the terminals of FIGS. 1-4.

DETAILED DESCRIPTION

Figure 1:
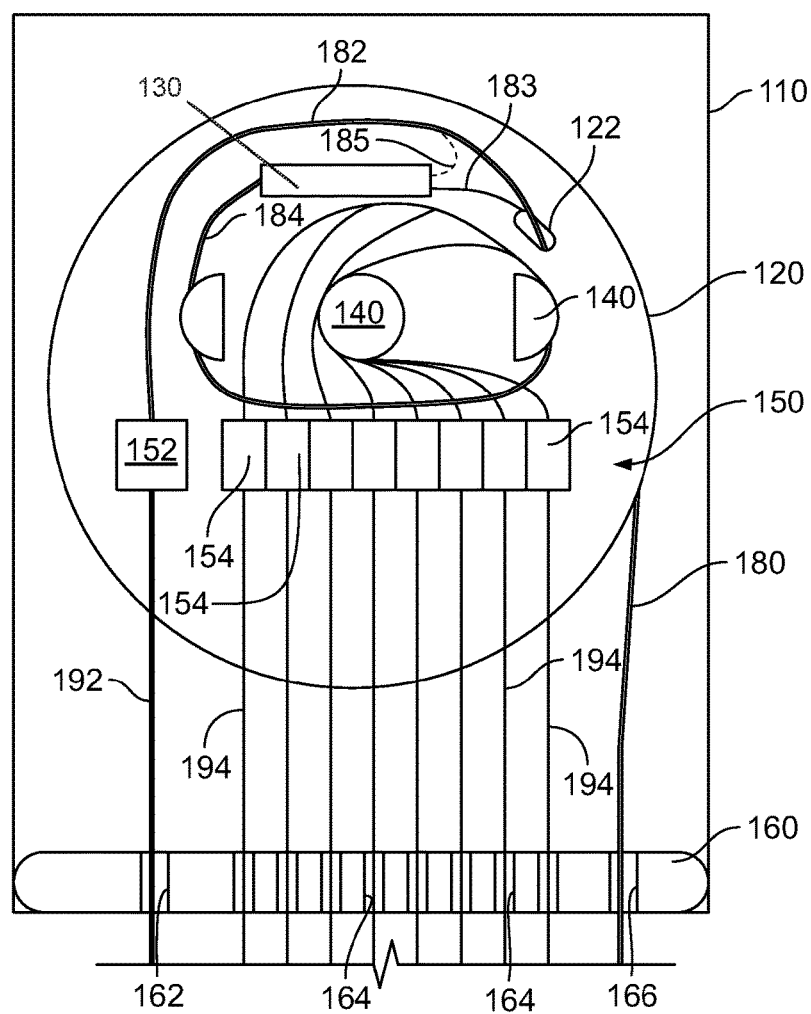
FIG. 1 is a perspective view of a fiber optic distribution terminal having exemplary features of aspects in accordance with the principles of the present disclosure.

Reference will now be made in detail to the exemplary aspects of the present disclosure that are illustrated in the accompanying drawings. Wherever possible, the same reference numbers will be used throughout the drawings to refer to the same or like structure.

In general, a fiber optic distribution terminal includes a storage spool from which a first optical fiber cable may be deployed. The fiber optic distribution terminal also includes a termination region at which multiple subscriber fibers may be connected to fibers of the first optical fiber cable. The termination region is carried by the storage spool such that the termination region rotates in unison with the storage spool relative to the enclosure when first optical fiber cable is dispensed/deployed from the storage spool. In certain examples, the termination region includes at least one multi-fiber optical adapter and at least one single-fiber optical adapter.

In use, the first cable is wound around the storage spool and disposed within the distribution terminal so that a free end of the first cable is disposed outside of the distribution terminal. Fibers of the first cable are routed to one or more optical adapters at the termination region and connectorized ends of the fibers are plugged into first adapter ports at the termination regions. The distribution terminal is deployed in the field.

A user pulls on a free end of the first cable to unwind the first cable from the spool and to pull the unwound length of the first cable out of the distribution terminal through a cable port. As the user pulls the first cable, the first cable causes the storage spool to rotate relative to the distribution terminal. The termination regions rotate in unison with the cable storage spool so that no strain is applied to the connectorized ends of the fibers of the first fiber optic cable. The user continues pulling until a sufficient length of the first cable is deployed and second adapter ports at the termination region are aligned with subscriber cable ports of the distribution terminal.

In some implementations, multiple distribution terminals can be daisy-chained together in the field. For example, the first cable can be paid out of one of the distribution terminals and a connectorized end of the first cable can be plugged into the multi-fiber optical adapter at the termination region of another distribution terminal. Accordingly, the distribution terminals can be deployed within an environment (e.g., a multi-dwelling building, an office, etc.) and optically coupled together before or when service is connected to individual subscribers.

When subscriber service is desired, the user opens the distribution terminal to access the termination region. The user routes subscriber fibers into the distribution terminal through subscriber cable pass-throughs and plugs connectorized ends of the subscriber fibers into the second adapter ports at the termination region. When the subscriber fibers are connected at the termination region, the user closes and optionally secures the distribution terminal.

Referring now to FIG. 1, a schematic diagram of an example fiber optic distribution terminal 100 is shown. The fiber optic distribution terminal 100 includes an enclosure 110 in which a cable spool 120 is disposed. The cable spool 120 is configured to selectively rotate relative to the enclosure 110. In certain implementations, the cable spool 120 can be locked in a single rotational orientation relative to the enclosure 110.

A first optical cable 180 is wrapped around the cable spool 120. A first end of the first optical cable 180 extends away from the spool 120. In some implementations, the first end of the first optical cable 180 exits the enclosure 110 through a port. In other implementations, the first end of the first optical cable 180 is sized and configured to be fed through the port to allow the first optical cable 180 to exit the enclosure 110. An opposite second end of the first optical cable 180 is routed through an opening 122 to an exterior of the spool 120.

One or more optical adapters 150 are disposed at the cable spool 120. The optical adapters 150 rotate unitarily with the cable spool 110 relative to the enclosure 110. In some implementations, the optical adapters 150 can be mounted to the flange that extends radially outwardly from the drum of the cable spool 120. In other implementations, the optical adapters 150 can be mounted to a frame couples to the cable spool 120. Each optical adapter 150 has a first port and an oppositely facing second port. In certain examples, the first ports of the optical adapters 150 face towards the splitter 130. In certain examples, the second ports of the optical adapters 150 face towards the wall of the enclosure defining the port.

In some implementations, the optical adapters 150 include one or more multi-fiber optical adapters 152. In other implementations, the optical adapters 150 include one or more single-fiber optical adapters 154. In certain implementations, the optical adapters 150 include one or more multi-fiber optical adapters 152 and one or more single-fiber optical adapters 154. In the example shown, the optical adapters 150 include one multi-fiber optical adapter 152 and eight single-fiber optical adapters 154.

At least a first optical fiber 183 of the first optical cable 180 is separated out from a remainder of the optical fibers 182. The first optical fiber 183 is optically coupled to at least an optical connector received at the first port of one of the single-fiber optical adapters 154. In certain implementations, the first optical fiber 183 can be routed to an input of an optical splitter 130 (e.g., an optical power splitter) 130 disposed on the cable spool 120. For example, the optical splitter 130 can be mounted to a flange that extends radially outwardly from a drum of the cable spool 120. The optical splitter 130 splits optical signals carried by the first input fiber 183 onto a plurality of splitter pigtails 184. A connectorized end of each splitter pigtail 184 is received at the first port of a respective single-fiber optical adapter 154.

In certain implementations, others of the optical fibers 182 are optically coupled to a multi-fiber connector 187 (FIG. 2) received at the first port of the multi-fiber optical adapter 152. For example, second ends of the optical fibers 182 may terminate at the multi-fiber optical connector 187. In certain implementations, the optical fibers 182 are indexed at the multi-fiber optical connector 187 so that one of the optical fibers 182 is received at a first sequential fiber position of the multi-fiber optical connector 187.

In certain implementations, the first ends of the others of the optical fibers 182 are terminated at a first multi-fiber connector 188 (FIG. 2) and the second ends of the others of the optical fibers 182 are terminated at a second multi-fiber connector 187. The first and second ends of each of the others of the optical fibers 182 are secured at different fiber receiving positions of the first and second multi-fiber connectors 188, 187. For example, the first ends are secured at positions 2-12 of the first multi-fiber connector 188 and the second ends are received at positions 1-11 of the second multi-fiber connector 187. The first input fiber 183 is secured at position 1 of the first multi-fiber connector 188. Thus, the second ends are each indexed one position over with respect to their corresponding first ends. In other examples, the second ends can be indexed more than one position with respect to their corresponding first ends.

In certain implementations, the optical splitter 130 receives a second input fiber 185 so that optical signals carried by either the first input fiber 183 or the second input fiber 185 are split onto the splitter pigtails 184. In certain implementations, the second input fiber 185 is not optically coupled to the first optical cable 180. In certain examples, the second input fiber 185 is coupled to the multi-fiber connector at which the optical fibers 182 terminate. In an example, the second input fiber 185 is coupled to the multi-fiber optical connector at a last sequential fiber position.

Additional information regarding fiber indexing and bi-directional fiber indexing can be found in U.S. Publication No. 2014/0254986, the disclosure of which is hereby incorporated herein by reference.

Cable management structures 140 (e.g., cable spools, bend radius limiters, retention tabs, etc.) are disposed at the cable spool 120 to guide the optical fibers 182 and splitter pigtails 184 to the optical adapters 150.

Figure 2:
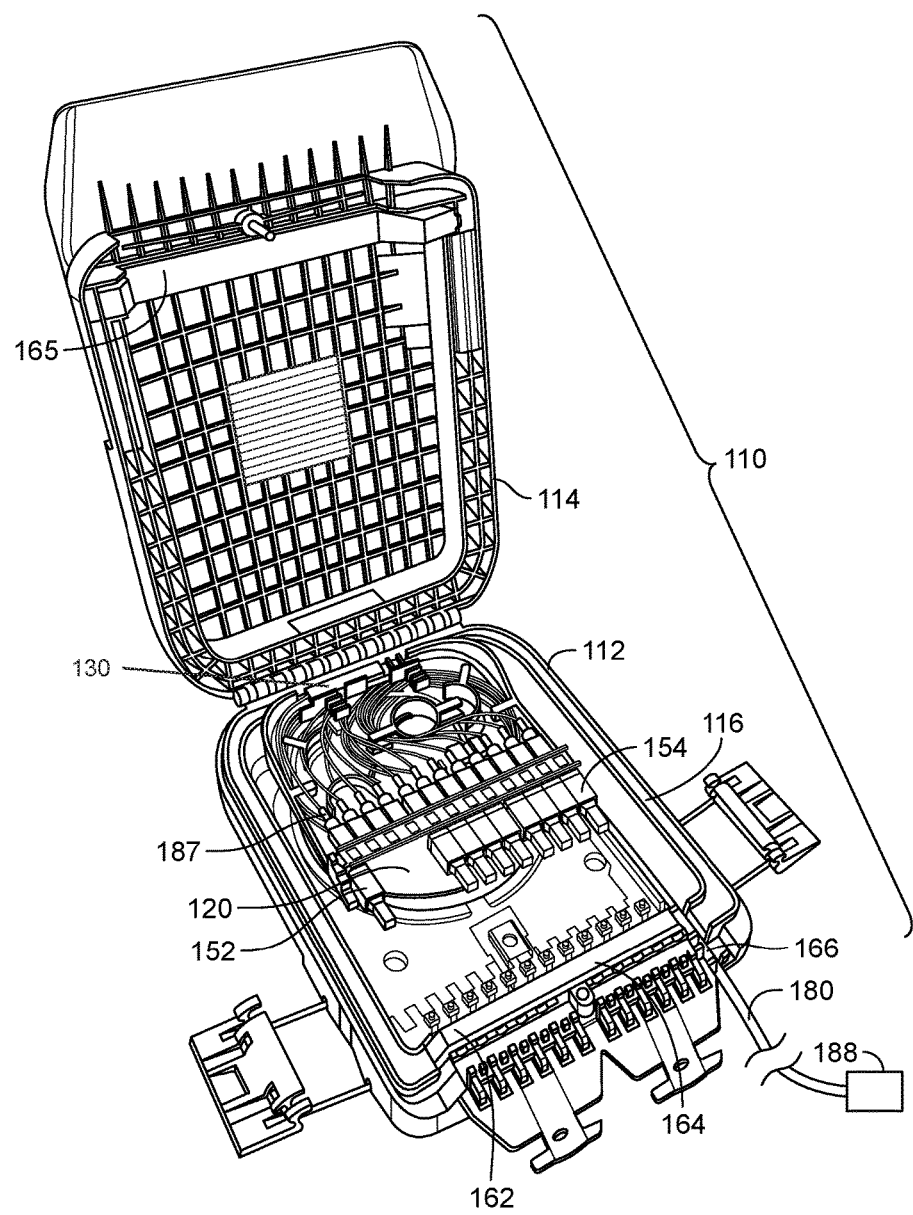
FIG. 2 illustrates an example implementation of the distribution terminal of FIG. 1 with the first optical cable wrapped around the cable spool.

FIG. 2 illustrates an example implementation of the distribution terminal 100 of FIG. 1. The enclosure 110 includes a base 112 and a cover 114. In the depicted embodiment, the cover 114 is pivotally engaged with the base 112. The cover 114 moves between an open position providing access to an interior region of the enclosure 110 and a closed position inhibiting access to the interior region. In certain implementations, a gasket 116 (e.g., an environmental seal, such as a water-tight gasket) is disposed between the base 112 and cover 114 when they are in the closed position. In certain implementations, the cover 114 can be locked in the closed position relative to the base 112 (e.g., by a fastener, by latches, by clamps, etc.).

The base 112 includes a base wall, a first sidewall, an oppositely disposed second sidewall, a third sidewall that extends between the first and second sidewalls and an oppositely disposed fourth sidewall. The first, second, third and fourth sidewalls extend outwardly from the base wall. In the depicted embodiment, the first, second, third and fourth sidewalls are generally perpendicular to the base wall. The cover 114, the base wall, and the first, second, third and fourth sidewalls of the base 112 cooperatively define an interior region.

The first sidewall defines a first cable port (e.g., a slot) that provides access to the interior region of the enclosure 110. In certain examples, the first cable port extends along a height of the first sidewall. In an example, the first cable port extends the full height of the first sidewall. The first cable port is adapted to provide a path through which the first optical cable 180 can exit the interior region of the enclosure 110. In certain implementations, the enclosure 110 includes an additional cable port extending through the fourth sidewall. The additional cable port is adapted to provide an alternate location through which the first optical cable 180 can exit the interior region of the enclosure 110.

The first sidewall of the enclosure 110 also defines a plurality of subscriber cable ports. In the depicted embodiment, the subscriber cable ports are aligned along a width of the first sidewall. In certain implementations, each subscriber cable port is sized to enable at least a subscriber fiber to extend through the subscriber port and into the interior region. In certain implementations, the subscriber ports are sized to enable a subscriber cable including a buffered or jacketed fiber to enter the interior region of the enclosure 110.

In certain implementations, the first sidewall of the enclosure 110 also defines a second cable port through which a second optical cable can enter the interior region of the enclosure 110. For example, the second optical cable can extend into the enclosure 110 and plug into the first adapter port of the multi-fiber optical adapter 152 disposed at the termination region. In certain examples, the second cable port is aligned with the subscriber cable ports. In the example shown, the subscriber ports are disposed between the first and second cable ports.

In certain implementations, the gasket 116 extends across the cable ports. In some implementations, the gasket 116 includes a first portion 160 that defines open-ended slits 162, 164, 166 at the cable ports. For example, the gasket 116 defines a first slit 166 aligned with the first cable port to enable the enclosure to remain environmentally sealed even when the first optical cable 180 extends into the enclosure 110; the gasket 116 defines a second slit 162 aligned with the second cable port to enable the enclosure to remain environmentally sealed even when a second optical cable 190 extends into the enclosure 110; and the gasket 116 defines one or more slits 164 aligned with the subscriber cable ports to enable the enclosure 110 to remain environmentally sealed even when subscriber fibers extend into the enclosure 110. In certain implementations, the gasket 116 includes a second portion 165 that selectively closes the open-ended slits. For example, the first portion 160 may be mounted to the base 112 and the second portion 165 may be mounted to the cover 114. In an example, the first and second portions 160, 165 are gel-type seals. In another example, the first and second portions 160, 165 are foam-type seals.

Additional information regarding enclosures and cable spools suitable for supporting the cabling described above can be found in U.S. Publication No. 2013/0094828 and U.S. Publication No. 2013/0209049, the disclosures of which are hereby incorporated herein by reference.

Figure 3:
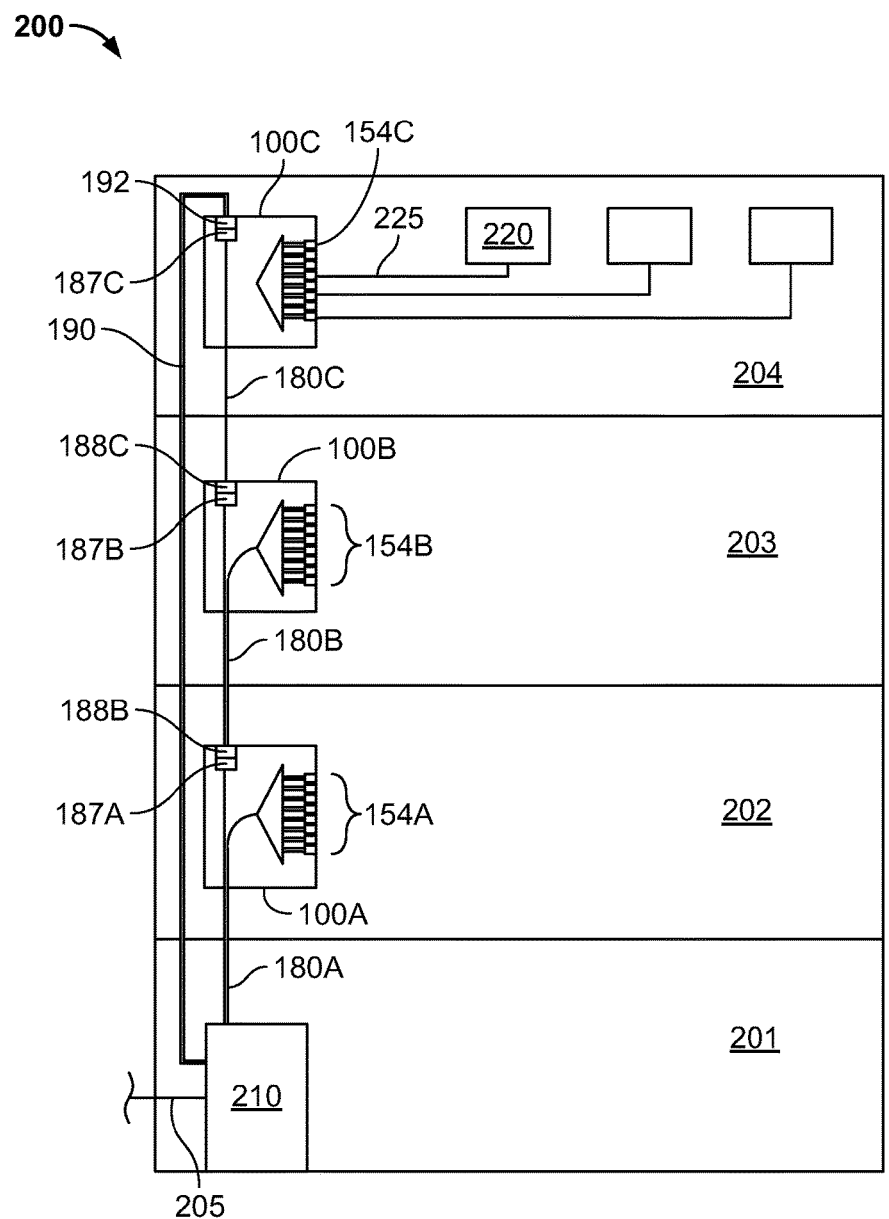
FIG. 3 is a schematic diagram of an example multi-dwelling building in which multiple distribution terminals of FIG. 1 can be chained together to provide an optical fiber distribution system with redundancy.
Figure 4:
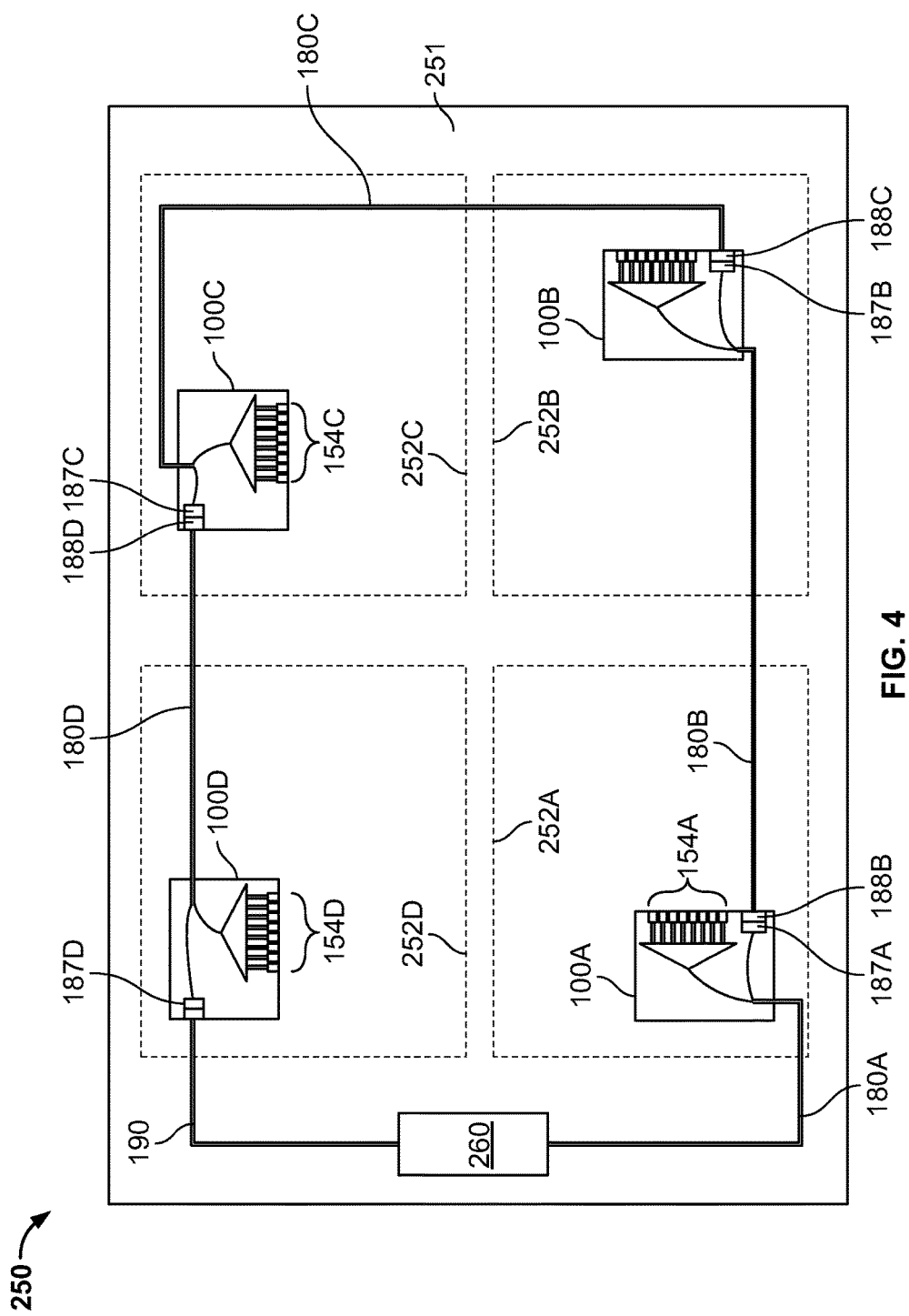
FIG. 4 is a schematic diagram of an example office environment in which multiple distribution terminals of FIG. 1 can be chained together to provide an optical fiber distribution system with redundancy.

FIGS. 3 and 4 illustrate two environments in which the distribution terminal 100 can be utilized. FIG. 3 shows multiple distribution terminals 100 daisy-chained together in a multi-dwelling building 200. The building 200 has multiple floors 201-204. In the example shown, the building 200 has four floors 201-204. In other implementations, the building 200 may have any desired number of floors.

An access point of an optical network is disposed at one of the floors. For convenience, this disclosure will assume that the access point is a fiber distribution hub 210 disposed at the bottom floor 201 (e.g., a basement, a street-level floor, etc.) of the building 200. A distribution cable 205 is routed into the building 200 and received at the fiber distribution hub 210. In other examples, the hub 210 can be disposed at any of the floors 201-204. In still other examples, other types of network access nodes can be utilized.

A first distribution terminal 100A is mounted at a second floor 202 of the building 200. The first optical cable 180A of the first distribution terminal 100A is paid out from the cable spool 120 so that a connectorized end of the first optical cable 180A can be connected at the fiber distribution hub 210. Accordingly, optical network signals provided to the fiber distribution hub 210 can be carried to the first distribution terminal 100A and made available to any subscribers on the second floor 202 via the subscriber ports 154A. The optical signals also are made available via the multi-fiber connector 187A plugged into the first port of the corresponding optical adapter 152.

A second distribution terminal 100B is mounted at a third floor 203 of the building 200. The first optical cable 180B of the second distribution terminal 100B is paid out from the corresponding cable spool 120 so that a connectorized end 188B of the first optical cable 180B can be plugged into the multi-fiber adapter 152 of the first distribution terminal 100A to mate with the multi-fiber connector 187A. Accordingly, optical network signals provided to the fiber distribution terminal 100A can be carried to the second distribution terminal 100B and made available to any subscribers on the third floor 203 via the subscriber ports 154B. The optical signals also are made available via the multi-fiber connector 187B plugged into the first port of the corresponding multi-fiber adapter 152 of the second distribution terminal 100B.

A third distribution terminal 100C is mounted at a fourth floor 204 of the building 200. The first optical cable 180C of the third distribution terminal 100C is paid out from the corresponding cable spool 120 so that a connectorized end 188C of the first optical cable 180C can be plugged into the multi-fiber adapter 152 of the second distribution terminal 100B to mate with the multi-fiber connector 187B. Accordingly, optical network signals provided to the second fiber distribution terminal 100B can be carried to the third distribution terminal 100C and made available to any subscribers on the fourth floor 204 via the subscriber ports 154C. The optical signals also are made available via the multi-fiber connector 187C plugged into the first port of the corresponding multi-fiber adapter 152 of the third distribution terminal 100C.

The system of FIG. 3 uses indexing of fibers to ensure that a live fiber will be provided at the first fiber position of a first multi-fiber connector 188 received at the multi-fiber optical adapter 152 when the distribution terminals are strung together in a chain. After each indexing step, an additional fiber is no longer used since it is not connected to service through the first multi-fiber connector 188. The unused fibers in this instance would be dead fibers.

In certain implementations, another optical cable 190 can be routed from the fiber distribution hub 210 to the multi-fiber optical adapter 152 of the third distribution terminal 100C to mate with the multi-fiber connector 187C. The optical cable 190 provides redundancy within the system by providing a second path by which optical signals can be carried from the fiber distribution hub 210 to all of the distribution terminals 100A, 100B, 100C.

For example, the dead fibers can be used to carry signals as live fibers. These signals are carried from the fiber distribution hub 210, over the cable 190 to the third distribution terminal, over the cable 180C to the second distribution terminal 100B, over the cable 180B to the first distribution terminal 100A. This implementation can double the capacity of the system by having signals traveling in one direction as they are indexed up in the multi-fiber connectors, and a second set of signals in the opposite direction as the fibers are indexed into the multi-fiber connectors as new fibers.

The above bi-directional usage is advantageous in a fiber loop or fiber ring. Another advantage could arise as a redundant fiber path that could serve the drop locations that are downstream from a cable cut. The system of FIG. 3 removes the dead fibers and provides options for using them as live fibers with the bi-directional usage. The number can vary as the number of fibers in the multi-fiber connector varies.

FIG. 4 illustrates multiple distribution terminals 100A-100D deployed in an office environment. In the example shown, the office 250 is located on a single floor 251 of a building. In other implementations, the office 250 can be spread over multiple floors. In some implementations, the cabling between the distribution terminals 100A-100D can be disposed below the floor 251. The office 250 is divided into various workstations 252A-252D at which desks, cubicles, or various types of equipment (e.g., Optical Network Terminals) can be disposed. In the example shown, each workstation 252A-252C has a corresponding distribution terminal 100A-100D.

In certain implementations, the distribution terminals 100A-100D are mounted at the respective workstations 252A-252D. The first optical cables 180A-180D are paid out from the corresponding cable spools 120 and the connectorized ends 188A-188D are plugged into ports at the hub 260 or previous terminal 100A-100C. The subscriber ports 154A-154D are available to provide optical signals to equipment or ports at the work stations 252A-252D.

In certain implementations, an optical cable 190 connects the fiber distribution hub 260 to the last distribution terminal in the chain (i.e., the fourth distribution terminal 100D in FIG. 4). Accordingly, the optical cable 190 and unused fibers provide a second path along which optical signals can reach the distribution terminals 100A-100D.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A fiber optic distribution terminal comprising:
an enclosure including a base and a cover, the cover being moveable relative to the base between an open position and a closed position, the enclosure defining a payout aperture and a cable access region;
a cable spool disposed within the enclosure and being configured to rotate relative to the enclosure;
a plurality of single-fiber optical adapters carried by the cable spool so that the single-fiber optical adapters rotate in unison with the cable spool relative to the enclosure;
an optical power splitter carried by the cable spool so that the optical power splitter rotates in unison with the cable spool relative to the enclosure, the optical power splitter splitting optical signals from an input of the optical power splitter onto a plurality of splitter pigtails having connectorized ends routed to the single-fiber optical adapters;
a multi-fiber optical adapter carried by the cable spool so that the multi-fiber optical adapter rotates in unison with the cable spool relative to the enclosure; and
a cable including a plurality of optical fibers each extending between a respective first end and a respective second end, the first ends of the optical fibers of the cable being terminated at a first multi-fiber connector disposed external of the enclosure, the second end of a first of the optical fibers of the cable being routed to the input of the optical power splitter, the second ends of others of the optical fibers of the cable being terminated at a second multi-fiber connector routed to the multi-fiber optical adapter, the others of the optical fibers being indexed between the first and second multi-fiber connectors.

2. The fiber optic distribution terminal of claim 1, wherein the cover pivots relative to the base between the open and closed positions.

3. The fiber optic distribution terminal of claim 2, wherein the enclosure extends along a length between first and second ends, wherein the cover pivotally attaches to the base at the first end, and wherein the second end of the enclosure defines the cable access region.

4. The fiber optic distribution terminal of claim 3, wherein the second end of the enclosure defines the payout aperture.

5. The fiber optic distribution terminal of claim 1, wherein the payout aperture and the cable access region are environmentally sealed.

6. The fiber optic distribution terminal of claim 5, wherein a gasket is disposed at the cable access region, the gasket defining one or more slits.

7. The fiber optic distribution terminal of claim 1, wherein the enclosure is configured to be mounted to a wall.

8. The fiber optic distribution terminal of claim 1, wherein a tray is carried by the cable spool so that the tray rotates in unison with the cable spool relative to the enclosure, the tray defining guide channels for routing the splitter pigtails between the optical power splitter and the single-fiber optical adapters.

9. The fiber optic distribution terminal of claim 8, wherein the tray includes a cable spool.

10. The fiber optic distribution terminal of claim 8, wherein the single-fiber optical adapters mount to the tray.

11. The fiber optic distribution terminal of claim 8, wherein the multi-fiber optical adapter mounts to the tray.

12. The fiber optic distribution terminal of claim 1, wherein the single-fiber optical adapters are grouped together in a row.

13. The fiber optic distribution terminal of claim 12, wherein the multi-fiber optical adapter aligns with the single-fiber optical adapters in the row.

14. The fiber optic distribution terminal of claim 12, wherein the multi-fiber optical adapter is laterally offset from the single-fiber optical adapters.

15. The fiber optic distribution terminal of claim 1, further comprising a second input fiber extending between the input of the optical power splitter and the second multi-fiber connector.

16. The fiber optic distribution terminal of claim 1, wherein the cable spool is lockable in a single rotational orientation relative to the enclosure.

17. The fiber optic distribution terminal of claim 1, wherein the cover is lockable to the base.

18. The fiber optic distribution terminal of claim 1, wherein the payout aperture includes a slot defined in a sidewall of the enclosure.

19. The fiber optic distribution terminal of claim 1, further comprising a plurality of subscriber fibers extending into the enclosure through the cable access region, the subscriber fibers being terminated by optical connectors received at the single-fiber optical adapters.

20. The fiber optic distribution terminal of claim 1, wherein the cable is a first cable, and further comprising a second cable including a plurality of optical fibers, the optical fibers of the second cable being terminated by a third multi-fiber connector, the second cable being routed into the enclosure through the cable access region, the third multi-fiber connector being routed to the multi-fiber optical adapter.

* * * * *